United States Patent
Drottar et al.

(10) Patent No.: US 7,415,032 B2
(45) Date of Patent: Aug. 19, 2008

(54) AGGREGATABLE CONNECTIVITY

(75) Inventors: Ken Drottar, Portland, OR (US); David S. Dunning, Portland, OR (US); Andrew Martwick, Folsom, CA (US); Zale Schoenborn, Portland, OR (US); Scott T. Gardiner, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 931 days.

(21) Appl. No.: 10/294,180

(22) Filed: Nov. 13, 2002

(65) Prior Publication Data
US 2004/0090928 A1 May 13, 2004

(51) Int. Cl.
*H04J 3/16* (2006.01)
(52) U.S. Cl. .................................. 370/437; 370/465
(58) Field of Classification Search .................. None
See application file for complete search history.

(56) References Cited

U.S. PATENT DOCUMENTS

| | | | |
|---|---|---|---|
| 6,009,488 A | 12/1999 | Kavipurapu | |
| 6,563,827 B1 * | 5/2003 | Brueckheimer et al. | 370/395.1 |
| 6,600,734 B1 * | 7/2003 | Gernert et al. | 370/352 |
| 6,671,253 B1 * | 12/2003 | Alexander et al. | 370/217 |
| 6,748,435 B1 * | 6/2004 | Wang et al. | 709/225 |
| 6,873,624 B1 * | 3/2005 | Johansson et al. | 370/465 |
| 6,963,585 B1 * | 11/2005 | Le Pennec et al. | 370/468 |
| 6,996,110 B1 * | 2/2006 | Amara et al. | 370/396 |
| 7,020,087 B2 * | 3/2006 | Steinberg et al. | 370/238 |
| 7,209,489 B1 * | 4/2007 | Bailey et al. | 370/412 |
| 2002/0169815 A1 * | 11/2002 | Wong et al. | 709/100 |
| 2003/0061338 A1 * | 3/2003 | Stelliga | 709/224 |
| 2004/0042448 A1 * | 3/2004 | Lebizay et al. | 370/362 |
| 2004/0091027 A1 * | 5/2004 | Booth | 375/219 |
| 2004/0139088 A1 * | 7/2004 | Mandato et al. | 707/100 |
| 2004/0218627 A1 * | 11/2004 | Kobayashi | 370/465 |
| 2005/0111531 A1 * | 5/2005 | Booth et al. | 375/219 |

OTHER PUBLICATIONS

PCI Express Base Specification Revision 1.0, Jul. 22, 2002, Copyright 2002, PCI-SIG, 422 Pgs.
3GIO Specification Rev. 0.9, Arapahoe Promoter Working Group Confidential, Copyright 2001.

* cited by examiner

*Primary Examiner*—Andrew C. Lee
(74) *Attorney, Agent, or Firm*—Blakely, Sokoloff, Taylor & Zafman LLP

(57) ABSTRACT

A first device and a second device, each coupled to one or more signal paths, attempting to transmit symbols over one or more of the signal paths, identifying one or more signal paths over each of which each device is able to transmit a symbol to the other device and over which each device is able to receive a symbol from the other device, and enrolling the identified signal paths into an aggregation of signal paths operable to provide for communication between the devices.

22 Claims, 2 Drawing Sheets

Basic Structure of a
3GIO-like Signal Path

Link Width Negotiation
in 3GIO-like systems

AGGREGATABLE CONNECTIVITY

BACKGROUND

Digital systems of all types require interconnection. For example, internal and external devices may need to be connected to each other in a digital system such as a computer system, computer systems may need to be connected to each other for high-bandwidth computer-computer communication as in high-powered computing clusters, and network devices in general need to communicate over a network. In all of these, the trend is toward high speed, point-to-point interconnection, and the use of packet switching techniques to exchange data. There are several advantages to this type of technology, including the ability to have an interconnect that is dynamically routable, scalable, reliable and robust in the presence of individual connection failures.

One specific means of achieving some of these advantages is the use of multiple, aggregated connections. The advantages of aggregation include support for scaling in bandwidth by scaling the size of the aggregation; the possibility of graceful degradation because remaining active connections in the aggregation can continue to serve as an interconnect even after one or more connections fail; the capability of devices to scale downward as well as upward, allowing a device to communicate with another that is incapable of supporting the full bandwidth of the first device by using a smaller aggregation of connections between the devices.

In systems where the identity and capability of devices to be interconnected in this manner are known, designing the aggregations of connections may be done in advance. However such aggregation may not be done in advance if the actual devices to be interconnected may change on the fly and devices capable of supporting different bandwidths are potentially likely to be connected to each other.

DETAILED DESCRIPTION

In an embodiment of the claimed subject matter, two devices that may be interconnected by existing signal paths perform a negotiation in order to identify signal paths that actually allow exchange of data between the devices; and further in order to aggregate some of the signal paths discovered into a bundle or set of signal paths that then allow the devices to gain some of the benefits of aggregation mentioned above.

3GIO Specification. The 3GIO ($3^{rd}$ Generation General Purpose Input Output Interconnect) Specification, version 0.9 (3GIOv0.9 Specification), describes some features of one specific embodiment of the claimed subject matter. 3GIO Specification v 0.9, Arapahoe Promoter Working Group, Nov. 14, 2001. The 3GIOv0.9 Specification describes the 3GIOv0.9 architecture, interconnect attributes, bus management, and the programming interface required to design and build systems and peripherals that are compliant with the specification. In systems conforming to the 3GIOv0.9 Specification, two devices interconnected physically in accordance with the specification may perform a negotiation protocol in order to form an aggregated connection.

Additional features in embodiments that exemplify the claimed subject matter are described herein, but are not described in and are not a part of the 3GIOv0.9 specification. Accordingly, systems, devices and interconnect that conform to the 3GIOv0.9 specification as augmented by the description herein are termed "3GIO-like."

Definitions and Basic Concepts. The physical layer datalink interconnection for 3GIO-like systems is termed a link. A link is terminated at a device in a port. A link, in turn, is an aggregation of lanes. Each lane, in turn, is an abstraction of the actual basic physical interconnect—a set of differential signal pairs (one pair for transmission, one pair for reception). Similarly, each port is an aggregation of individual connections between a device and an individual lane.

It is to be noted that the claimed subject matter is not limited to this embodiment, however. In other embodiments of the claimed subject matter, aggregates may be made up of signal paths that have a different physical implementation, for example, signal paths based on optical signals over an optical medium.

While the terms link and lane have specific meanings in the context of 3GIO-like systems, other systems or interconnects that embody the claimed subject matter may have different nomenclature for aggregate signal paths and signal paths respectively.

Figure 1:
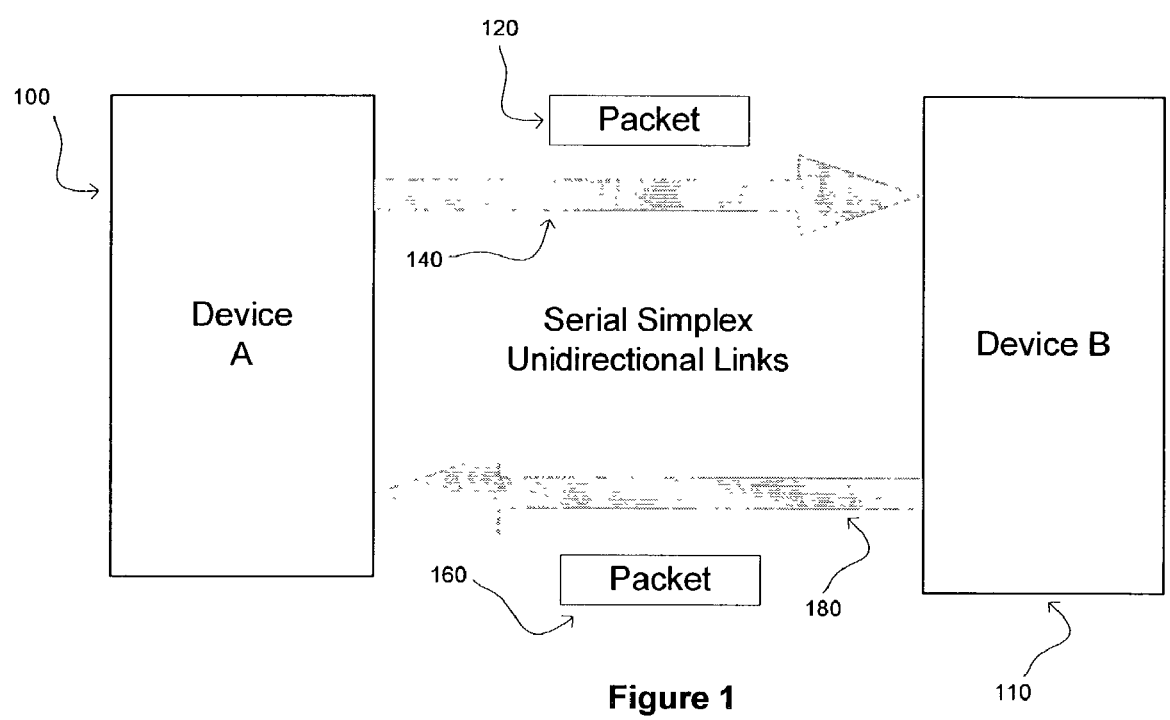
FIG. 1 depicts the basic structure of a 3GIO-like Connection.

FIG. 1 depicts the basic structure of a lane in a high-level diagram of the basic interconnection between two 3GIO-like devices A and B, 100 and 110 respectively. The devices communicate over dual simplex links 140 and 180. Packet flow on each link is unidirectional, for example, packet 120 travels from A to B and packet 160 from B to A. Dual simplex data transmitted on these point-to-point connections is self-clocked and its transmission bandwidth increases linearly with increases in interconnect width and frequency. To scale bandwidth, it is desirable for a link to aggregate lanes. During hardware initialization, each 3GIO-like link is set up following a negotiation of lane widths and frequency of operation by the two devices at each end of the link. Links are specific multiples of lanes and may comprise one of 1, 2, 4, 8, 12, 16, or 32 lanes.

The basic structure of a signal path in other embodiments of the claimed subject matter may differ, and consist, for example, of an optical data path or non-packetized communication over an electrical data path, infra-red transmission link, or a radio-frequency link, among others.

In general, 3GIO-like systems have at least one device that is termed the Root Complex. Devices are physically connected directly or indirectly to a Root Complex in a tree structure, with the Root Complex forming the root of the tree. Rules for the formation of links ensure that the tree structure is maintained by any new links that are formed. For any pair of devices attempting to establish a link, the device closer to the root complex in the tree structure is termed the upstream device, and the other device is termed the downstream device. For some numbers N and M, a port on a downstream device interfacing with N lanes to an upstream device is called an xN upstream port of that device; similarly, a port on an upstream device interfacing with M lanes to downstream devices is called an xM downstream port of that device.

In other embodiments of the claimed subject matter, devices may be connected using different topologies such as a fully connected graph; hub and spoke system; or in a loop, in three specific examples. In these embodiments, pairs of devices forming aggregate signal paths may or may not have a hierarchical tree like structure, unlike the 3GIO-like embodiment described.

When a 3GIO-like system is initialized, system devices perform a physical layer control process that configures and initializes each link for normal operation in a process termed link training. At an early stage in link training, the devices are able to exchange symbols. A device of the link training process is the transmission and reception of two training sequences of symbols, TS1 and TS2, each of which includes an ordered set of symbols sent over a lane. The symbols numbered 1 and 2 in each ordered set represent a link number and lane number respectively. Training sequences are described in the 3GIOv0.9 specification. Pairs of devices use training sequences to execute a link width negotiation protocol as part of link training. The protocol executes, for example, in hardware to determine an assignment of lanes and to form aggregations of the lanes into links and so to set up the structure of the interconnect between the pair of devices. Training a link also has several goals in addition to link width determination, as detailed in the 3GIOv0.9 Specification, that are not relevant to the subject matter herein. Though link width negotiation is outlined briefly in the 3GIOv0.9 specification, Section 4.2.4, the claims in this application are enabled by the detailed description of link width negotiation below.

Link width negotiation—Overview. 3GIO-like links are 1, 2, 4, 8, 12, 16 or 32 lanes in parallel, referred as x1, x2, x4, x8, x12, x16 and x32 links respectively. The number of lanes in a link is termed the size or width of a link. During link training, proposed link widths are communicated. An upstream device needs to support forming a link either at a width that it initially proposes or at a lower width if the downstream device cannot support the initially proposed width. The highest common lane width supported by both the upstream and the downstream devices that comprise the link is used.

In other embodiments of the claimed subject matter, aggregations of signal paths may be formed at widths not limited to the specific sizes listed above, and the values of each width or the number of widths may be different, or possibly even unbounded. In these other embodiments, two devices may select widths that need not be the highest common supported width between them in certain situations.

Defined 3GIO lane multiples within a link are x1, x2, x4, x8, x12, x16, and x32. The manufacturer of a given device determines which of the defined lane multiples it will support. There is no requirement for support of links of multiple lane widths across a given set of lane connections at a device. A device may implement support for more than one lane multiple among its various lane connections. The following nomenclature may be used to describe link formation: The lanes connected to the downstream port on the upstream device are numbered Ud[0]-Ud[N−1], and the lanes connected to the upstream port of the downstream device are numbered Du[0]-Du[M−1], where N, M are 1, 2, 4, 8, 12, 16 or 32 and N is greater than or equal to M. "<--->" is used in this context to denote a physical connection between an upstream and downstream transceiver pair. The lanes within one device's port is connected to the lanes of the other device's port consecutively by lane number in 3GIO-like systems, in either ascending or descending order started at either end of the port.

In 3GIO-like systems, only two possible connections are made:

Scenario 1: Du[0]<--->Ud[0], Du[1]<--->Ud[1], Du[2]<--->Ud[2], . . . Du[M−1]<--->Ud[M−1]

Or

Scenario 2: Du[0]<--->Ud[N−1], Du[1]<--->Ud[N−2], Du[2]<--->Ud[N−3], . . . Du[M−1]<--->Ud[N-M]

For example, in scenario 1, lanes numbered 0 to 7 at the downstream device may be connected to lanes numbered 0 to 7 respectively at the upstream device; in scenario 2, lanes numbered 0 to 7 at the downstream device may be connected to lanes numbered 15 down to 8 respectively at the upstream device. If other combinations of connections are made, the result of link width negotiation is undefined. In the case of scenario 2 above, each receiver logically reverses the lanes within that link. Of course, in other embodiments of the claimed subject matter, consecutive ordering of signal paths within an aggregated connection may not occur; nor may the ordering of signal paths within an aggregation be limited to the sequences described above; rather, aggregates may be constructed using other subsets of the signal paths available for aggregation.

Details of Link Width Negotiation

Tree Topology. Each device in a 3GIO-like system has a topological relationship to other devices with which it is physically connected, so that a device is either downstream from another device, or upstream relative to it. This is dictated by the physical connection topology, and topologies that do not conform to this relationship are not 3GIO-like systems. Each connection between a lane and a port of a 3GIO-like device is uniquely numbered at that device. A device may have up to 32 lanes, numbered 0-31, connected to it on the upstream side that may form no more than one upstream port to one upstream link; and up to 224 lanes, numbered 32-255, connected to it on the downstream side that may form one or more downstream ports to one or more downstream links. The lane numbers may be statically assigned, or they may be variable and modifiable by a device.

Consider a pair of 3GIO-like devices that are directly connected to each other by a set of lanes. Because of the conventions detailed above, the upstream device may have several links to downstream devices, but a downstream device may only have one link to an upstream device, thereby forming a tree structure. Of course, the upstream device may have upstream connections to a device further upstream and thus form an upstream port as well, and similarly the downstream device may have its own downstream connections and form downstream ports allowing for multiple levels in the link hierarchy.

Figure 2:
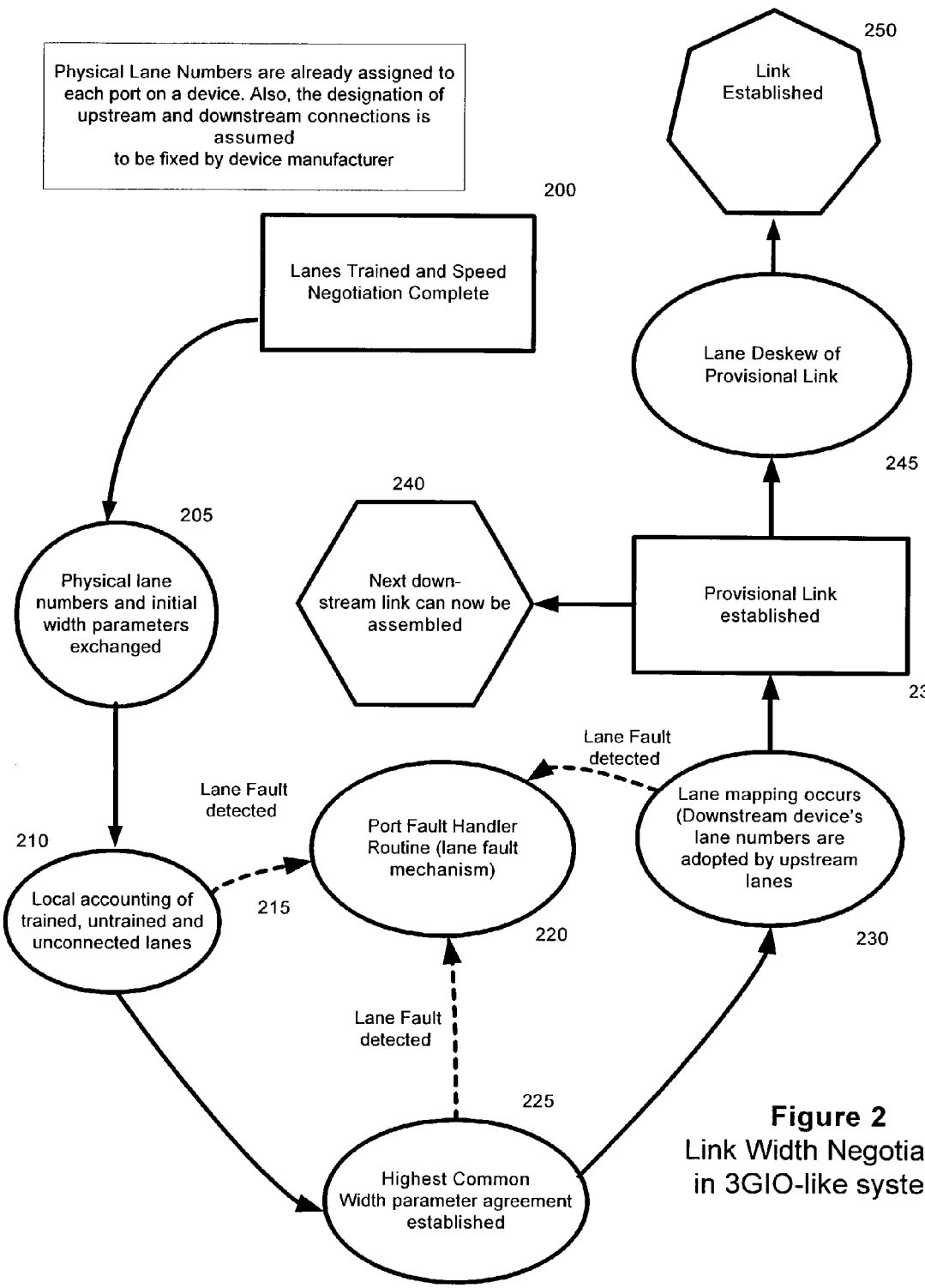
FIG. 2 depicts a state diagram for an upstream device in a link width negotiation.

Width Negotiation. The state diagram in FIG. 2 depicts the width negotiation process that is executed by the upstream device. After lane training is completed (FIG. 2 at 200), as described in the 3GIOv0.9 specification, a pair of 3GIO-like devices that are interconnected by lanes is ready to begin link width negotiation. See FIG. 2 at 205. At this stage, the devices will have exchanged information relating to their width parameters. The downstream device may form a link using its upstream lanes up to the total number of lanes it has available to form an upstream link, and the number of lanes that are trained and available for link formation is the downstream width parameter. The number of available lanes may or may not be the same as the number of lanes physically connected to the upstream side of the downstream device because some lanes may be defective or have failed to train for some other reason. Only trained lanes may be used to form a link. The upstream device may similarly be able to form a downstream port with some number of downstream connections and this initial number is specified by the upstream width parameter.

The upstream device initiates and controls link width negotiation. Width negotiation and link formation begins with an accounting by the upstream device of trained lanes as well as those lanes that did not train. The upstream device then compares the downstream width parameter against the available trained and unassigned lanes connected to its downstream port. The upstream device defers to the downstream device's width parameter during link width negotiation. The upstream device considers the link width(s) supported by trained and unallocated lanes connected to the downstream device. The highest common lane width supported by both the upstream and the downstream devices that will form the proposed link is used. See FIG. 2 at 225.

To form the link, the upstream device allocates available lanes to a link. The first lane to be allocated between the two devices is numbered lane 0 at the downstream device. Using the downstream device's lane ordering, the upstream device allocates and associates as many of its downstream lanes as possible into a link in a linear, increment by one, fashion until the downstream width parameter size is satisfied. From the perspective of the upstream device, successful fulfillment of the downstream width parameter constitutes formation of a provisional link. FIG. 2 at 230, 235.

The upstream device communicates the provisional link to the downstream device by sending the TS1 training sequence on all lanes, with symbol 1 set to a link number determined by the upstream device and symbol 2 set to the lane number that the downstream device has provided for that lane, on the lanes that are to be part of the provisional link, and transmitting a null value in those symbols in the training sequences transmitted on the other lanes. If the downstream device is able to accept the provisional link, it returns a similar sequence; otherwise it returns a training sequence with lane numbers (symbol 2) set to a null value on all lanes. If this occurs, the upstream device re-attempts link formation at a lower width.

If the downstream device is able to form a link at the proposed width, the upstream device observes the returned lane numbers on what is now the proposed link. The upstream device then performs a lane mapping by renumbering and adopting on its downstream port the lane numbers used by the downstream device to refer to the lanes in the link. From the perspective of the downstream device, successful matching of the upstream lane numbers to the downstream lane numbers constitutes formation of a provisional link. At this stage, the devices settle on the set of lanes comprising the newly formed link and the set of connections at each end that are now ports that terminate the link, by sending a series of TS2 training sequences confirming the link and lane numbers.

In other embodiments of the claimed subject matter, aggregations may be formed by other procedures. For example, a device may attempt to form the largest aggregation of signal paths possible with another device and then discard signal paths that are unable to participate. Further, signals of acceptance or rejection of possible aggregations may be communicated between the devices using a separate signaling system or by means other than special symbols. Thus the claimed subject matter is not limited to the specific link width negotiation protocol described above for 3GIO-like systems.

Lane De-Skew. After provisional link formation, either as an outcome from the initial width negotiation process or from the port fault handler routine as described below, the link is validated through the lane de-skew process. FIG. 2 at 245. The de-skew process is the same as the 3GIO-like training process except that all lanes within the link must transmit the training sequence simultaneously. Through buffering, the logic behind the de-skew mechanism aligns the incoming lanes to a character within the training sequence.

A link is established and validated when:

The width parameter sent within the downstream training sequence agrees with the upstream configuration and allocation of the link;

Lane numbers sent within the upstream training sequence agree with downstream lane assignments, i.e. lane mapping is successful; and, Data received on the lanes is aligned through the de-skew process.

The width negotiation process continues assembling further links, starting with the next trained and unallocated lane on the downstream port of the upstream device, until all trained lanes connected on the downstream side of the upstream device have been assigned to a link with their respective downstream devices.

Fault handling. When a lane within a linear array of upstream connections of the downstream device is not trained, including lane 0, or the upstream width parameter is smaller than the downstream width parameter, a lane fault is said to occur. See for example, FIG. 2 at 215. It is possible for a link to be formed after a lane fault occurs. To do so, the link is able to form at the next, and a lower, supported link width.

If both the downstream and upstream devices are capable of re-forming at the newly proposed link width, a new downstream width parameter is established by the lane fault mechanism in the port fault handler routine, described below. After the new downstream width parameter is established, the link is formed in a similar fashion to that described above except that the lane or lanes that triggered the lane fault must not be one of the lanes comprising the newly proposed link width.

The port fault handler routine is invoked during initial width negotiation, or during normal operation, when a connection to an untrained lane is detected. FIG. 2 at 220. The port fault handler is also invoked when the upstream width parameter is smaller than the downstream width parameter and when a previously faulted connection becomes trained. In response to the latter, the lane fault mechanism reestablishes the full, original default link width, if possible. Upon exit from the port fault handler routine, the downstream width parameter is changed to reflect the new width of the link.

The port fault handler routine first sets or reset the downstream width parameter to its original, default value in order to create a starting width from which a newly proposed link may become established. The newly proposed link width must include either lane number 0 on the downstream device or the largest (maximum) lane number associated with the link in question. Numerical location of the untrained or faulted lane in the link determines which subset of the lanes will be allocated to forming the newly proposed link. For example, if lane number 9 is a faulted lane in a x16 link, lanes 0-7 could form the allocated lanes for a new x8 link.

Other systems. Other digital interconnection systems that may use aggregation of basic signal paths (like 3GIO-like lanes) into higher level aggregates or sets of signal paths (like 3GIO-like links) include networking and high speed computer cluster interconnection, among others.

In a networking embodiment of the claimed subject matter, multiple point to point network links between two network nodes may be aggregated by an inter-node protocol into a single higher level connection whose width and speed vary with the number of lower level links available for dedication to this purposes. These network links may, for example, be one or more of optical, electrical, radio-frequency, or infrared frequency based links.

In another embodiment of the claimed subject matter, high speed interconnect "fabric" that ties computing clusters together may be formed using aggregation techniques. In this embodiment, multiple high bandwidth connections each terminated at each end in the same pair of computers may be used to form a single higher bandwidth link between the computers for applications that may require it such as parallel or distributed computing, redundant operation, or high-reliability operation, among others. Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner in one or more embodiments.

Implementation of Methods. The present invention includes various steps. The steps of the present invention may be performed by hardware devices, or may be embodied in machine-executable instructions, which may be used to cause a general-purpose or special-purpose processor or logic circuits programmed with the instructions to perform the steps. Alternatively, the steps may be performed by a combination of hardware and software. The present invention may be provided as a computer program product that may include a machine-readable medium having stored thereon data which when accessed by a machine may cause the machine to perform a process according to the present invention. The machine-readable medium may include, but is not limited to, floppy diskettes, optical disks, DVD-ROM disks, DVD-RAM disks, DVD-RW disks, DVD+RW disks, CD-R disks, CD-RW disks, CD-ROM disks, and magneto-optical disks, ROMs, RAMs, EPROMs, EEPROMs, magnet or optical cards, flash memory, or other type of media/machine-readable medium suitable for storing electronic instructions. Moreover, the present invention may also be downloaded as a computer program product, wherein the program may be transferred from a remote computer to a requesting computer by way of data signals embodied in a carrier wave or other propagation medium via a communication link (e.g., a modem or network connection).

Many of the methods are described in their most basic form but steps can be added to or deleted from any of the methods and information can be added or subtracted from any of the described messages without departing from the basic scope of the present invention. It will be apparent to those skilled in the art that many further modifications and adaptations can be made. The particular embodiments are not provided to limit the invention but to illustrate it. The scope of the present invention is not to be determined by the specific examples provided above but only by the claims below.

What is claimed is:

1. A method comprising a first device and a second device, each coupled to one or more serial signal paths, the said devices attempting to transmit symbols over one or more of the serial signal paths; identifying one or more serial signal paths over each of which the devices are able to exchange symbols; and enrolling the identified serial signal paths into an aggregation of signal paths to provide for communication between the devices, including:

the first device proposing to the second device a first potential enrollment of serial signal paths into a first proposed aggregation of signal paths, including the identified serial signal paths, such that no serial signal path in the first potential enrollment is already a member of a previously formed aggregation; if the second device is able to enroll each serial signal path in the first potential enrollment into an aggregation of signal paths, the second device and the first device agreeing to form the first proposed aggregation; otherwise, one of either the first device or the second device respectively proposing a second potential enrollment of serial signal paths into a second proposed aggregation of signal paths that differs from the first proposed aggregation, to the other device.

2. The method of claim 1 wherein the second proposed aggregation of signal paths has at least one fewer serial signal path than the first proposed aggregation of signal paths.

3. The method of claim 2 wherein the serial signal paths in each aggregation of signal paths are ordered and wherein the second proposed aggregation has an ordering of serial signal paths that differs from the ordering of signal paths of the first proposed aggregation.

4. The method of claim 1 wherein a device proposing a potential enrollment comprises the device sending to the other device a null symbol for each serial signal path not in the enrollment, and a non-null symbol that identifies the proposed aggregation of signal paths for each serial signal path in the enrollment.

5. The method of claim 1 wherein each serial signal path comprises a packet-switched, serial, digital connection.

6. The method of claim 5 wherein each serial signal path comprises dual unidirectional differential connections including a first differentially driven signal pair for transmission and a second differentially driven pair for reception.

7. The method of claim 1 wherein:
   each signal path is a lane;
   each aggregation of signal paths is a link; and
   each transmission of symbols comprises a transmission of a training sequences.

8. The method of claim 7 wherein each lane, link, symbol, training sequence, and device is a 3GIO-like lane, link, symbol, training sequence, and device respectively.

9. The method of claim 8 wherein the first device is an upstream device relative to the second device, and the second device is a downstream device relative to the first device.

10. An apparatus comprising:
    a first device and a second device, each coupled to one or more serial signal paths, and to identify one or more of the serial signal paths over which the devices are able to exchange symbols; and
    an aggregation of signal paths, including the identified serial signal paths, to provide for communication between the devices, and formed by the devices enrolling the identified serial signal paths into the aggregation of signal paths, including:
       the first device proposing to the second device first potential enrollment of serial signal paths into a first proposed aggregation of signal paths, including the identified serial signals paths, such that no serial signal path in the first potential enrollment is already a member of a previously formed aggregation; if the second device is able to enroll each serial signal path in the first potential enrollment into an aggregation of signal paths, the second device and the first device agreeing to form the first proposed aggregation; otherwise, one of either the first device or the second device respectively proposing a second potential enrollment of serial signal paths into a second proposed aggregation of signal paths that differs from the first proposed aggregation, to the other device.

11. The apparatus of claim 10 wherein each serial signal path comprises a packet-switched, serial, digital connection.

12. The apparatus of claim 11 wherein each serial signal pat comprises dual unidirectional differential connections including a first differentially driven signal pair for transmission and a second differentially driven pair for reception.

13. The apparatus of claim 10 wherein each serial signal path is a lane, and each aggregation of signal paths is a link.

14. The apparatus of claim 12 wherein each lane, link, symbol, and device is a 3GIO-like lane, link, symbol, and device respectively.

15. A system comprising:
a first device and a second device, each coupled to one or more serial signal paths, to exchange symbols representing proposed aggregations of the serial signal paths; and to select one of the aggregations of the serial signal paths over which to communicate data between the first device and the second device; and a processor connected to the selected aggregation of the serial signal paths, including:
the first device proposing to the second device a first potential enrollment of serial signal paths into a first proposed aggregation of signal paths, including the identified serial signal paths, such that no serial signal path in the first potential enrollment is already a member of a previously formed aggregation; if the second device is able to enroll each serial signal path in the first potential enrollment into aggregation of signal paths, the second device and the first device agreeing to form the first proposed aggregation; otherwise, one of either the first device or the second device respectively proposing a second potential enrollment of serial signal paths into a second proposed aggregation of signal paths that differs from the first proposed aggregation, to the other device.

16. The system of claim 15 wherein: each serial signal path is a 3GIO-like lane; each aggregation of serial signal paths is a 3GIO-like link; the first device and second device each is a 3GIO-like device; and each exchange of symbols comprises an exchange of 3GIO-like training sequences.

17. A machine accessible medium having stored thereon data which when accessed by a machine causes the machine to perform a method, the method comprising:
a first device and a second device, each coupled to one or more serial signal path;
attempting to transmit symbols over one or more of the serial signal path;
identifying one or more signal paths over each of which the devices are able to exchange symbols; and
enrolling the identified serial signal paths into an aggregation of signal paths to provide for communication between the devices, including:
the first device proposing to the second device a first potential enrollment of serial signal paths into a first proposed aggregation of signal paths, including the identified serial signal paths, such that no serial signal path in the first potential enrollment is already a member of a previously formed aggregation; if the second device is able to enroll each serial signal path in the first potential enrollment into an aggregation of signal paths, the second device and the first device agreeing to form the first proposed aggregation; otherwise, one of either the first device or the second device respectively proposing a second potential enrollment of serial signal paths into a second proposed aggregation of signal paths that differs from the first proposed aggregation, to the other device.

18. The machine accessible medium of claim 17 wherein the second proposed aggregation of signal paths has at least one fewer serial signal path than the first proposed aggregation.

19. The machine accessible medium of claim 18 wherein the serial signal paths in each aggregation of signal paths are ordered and wherein the second proposed aggregation of signal paths has an ordering of serial signal paths that differs from the ordering of signal paths of the first proposed aggregation of signal paths.

20. The machine accessible medium of claim 17 wherein a device proposing a potential enrollment comprises the device sending to the other device a null symbol for each serial signal path not in the enrollment and a non-null symbol that identifies the proposed aggregation of signal paths for each serial signal path in the enrollment.

21. The machine accessible medium of claim 17 wherein each serial signal path is a lane;
each aggregation of serial signal paths is a link; and
each transmission of symbols comprises a transmission of a training sequences.

22. The machine accessible medium of claim 21 wherein each lane, link, symbol, training, sequence, and device is a 3GIO-like lane, link, symbol, training sequence, and device respectively.

* * * * *

UNITED STATES PATENT AND TRADEMARK OFFICE
CERTIFICATE OF CORRECTION

PATENT NO. : 7,415,032 B2
APPLICATION NO. : 10/294180
DATED : August 19, 2008
INVENTOR(S) : Drottar et al.

It is certified that error appears in the above-identified patent and that said Letters Patent is hereby corrected as shown below:

In column 8, at line 66 delete, "pat" and insert --path--.

In column 9, at line 40 delete, "path;" and insert --paths:--.

In column 9, at line 42 delete, "path;" and insert --paths:--.

Signed and Sealed this

Twenty-second Day of December, 2009

David J. Kappos
*Director of the United States Patent and Trademark Office*